United States Patent Office 3,137,685
Patented June 16, 1964

3,137,685
ACETO-ACETARYLIDE AZO QUINOLINE
COLORING COMPOUNDS
Donald Buckley and Joseph Glassman, Manchester, England, assignors to Imperial Chemical Industries Limited, London, England, a corporation of Great Britain
No Drawing. Filed Nov. 14, 1960, Ser. No. 68,694
6 Claims. (Cl. 260—155)

This invention relates to new azo colouring matters and more particularly it relates to new azo colouring matters suitable for the colouration of textile materials, paints, printing inks, rubber, artificial polymeric materials and fibre-forming materials.

United States Patent No. 2,754,293 relates to dyestuffs with the structure:

(or a tautomeric form thereof) in which A stands for the radical of a coupling component and in which the rings B and C may be further substituted. Although it is disclosed that pigments having the above structure may be obtained by coupling suitable diazotised amines with arylides of acetoacetic acid the only such pigments actually described in the said specification are obtained from coupling compounds which are bis-acetoacetic arylides, namely bis-acetoacetobenzidide and bis-acetoacetotolidide.

We have now found that valuable colouring matters having better fastness to light than the bis-acetoacetic-arylide pigments of United States Patent No. 2,754,293 are obtained by coupling 6-amine-2-hydroxyquinolines which carry particular substituents with certain monoacetoacetic arylides.

According to our invention therefore we provide the new azo colouring matters which in one of their tautomeric forms are of the formula wherein the ring A may carry not more than 2 substituents selected from methyl groups, lower alkoxy groups and chlorine atoms, X represents hydrogen, chlorine, methyl or lower alkoxy, one of the groups Y and Z represents hydrogen, chlorine, methyl or lower alkoxy and the other represents hydrogen or lower alkoxy provided that not more than 2 of the substituents represented by X, Y and Z are selected from methyl and lower alkoxy and also provided that when X is hydrogen, Z is also hydrogen.

As examples of lower alkoxy groups there may be mentioned methoxy and ethoxy.

The preferred colouring matters of our invention are those in which the ring A carries methyl groups in positions 5 and 8, or a chlorine atom or methoxy group in position 7 since we find that these have excellent fastness to light. Colouring matters of outstanding fastness to light are those wherein the ring A carries the preferred substituents and either X and Z each represent methoxy and Y represents chlorine, or X and Y each represent methyl and Z represents hydrogen, or X represents methyl and Y and Z each represents hydrogen.

According to a further feature of our invention we provide a process for the manufacture of the new azo pigments as hereinbefore defined which comprises coupling an amide coupling component of the formula:

wherein X, Y and Z have the meanings already stated with a diazotised amine of the formula:

wherein the ring A may carry substituents as stated above.

The process of the invention may conveniently be carried out by mixing a solution or suspension of the diazotised amine with an alkaline solution or suspension of the amide, stirring the mixture until the coupling is completed and isolating the precipitated pigment by filtration and washing, and, if desired, drying the pigment.

If desired, mixtures of amides of the above formula or mixtures of the diazotised amines may be used in the process of the invention.

The amide coupling components used in the process of the invention may conveniently be obtained by reacting (for example by heating) acetoacetic ester with a substituted aniline of the formula wherein X, Y and Z have the meanings already stated.

As examples of amides which may be used in the process of the invention there may be mentioned acetoacet-o-toluidide, acetoacet - p - toluidide, acetoacet - o - anisidide, acetoacet-o-chloranilide, acetoacet-p-anisidide, acetoacet-p-chloranilide, acetoacet-p-phenetidide, acetoacet-2:4-dimethylanilide, acetoacet-2:5-dimethoxyanilide, acetoacet-2:4-dimethoxyanilide, acetoacet-4-chloro-2:5-dimethoxyanilide and acetoacet-5-chloro-2:4-dimethoxyanilide.

The amines which may be used in the process of the invention are obtainable by the method described in United States Patent No. 2,754,293, that is to say by reaction of the appropriately substituted aniline with acetoacetic ester or diketene followed by ring closure of the product and subsequent nitration and reduction.

As examples of amines which may be used in the process of the invention there may be mentioned 6-amino-2-hydroxy-4-methylquinoline, 6-amino-2-hydroxy-4:7-dimethylquinoline, 6-amino-2-hydroxy-4:8-dimethylquinoline, 6-amino-2-hydroxy-4:5:8-trimethylquinoline, 6-amino - 7 - chloro - 2 - hydroxy-4-methylquinoline, 6-amino-7-methoxy-2-hydroxy-4-methylquinoline, 6-amino-8-chloro-2-hydroxy-4-methylquinoline, 6-amino-5:8-dimethoxy-2-hydroxy-4-methylquinoline.

The new colouring matters of our invention, either singly or in mixtures, in the form of dry powders are valuable for use as pigments, giving yellow to orange shades to good fastness to heat, to light and to solvents when incorporated in alkyd or other paint media. They are also useful in printing inks. Alternatively the new colouring matters may be used as pigments for colouring artificial polymeric materials, for example polyvinyl chloride, polythene or cellulose acetate giving bright yellow to orange shades of excellent fastness properties.

By milling the filtered and washed colouring matter obtained from the coupling step with water and a dispersing agent, for example disodium dinaphthylmethane-di-β-sulphonate, the new colouring matters of the invention may be obtained in the form of pastes suitable for the manufacture of emulsion paints, for the colouration of wallpaper, for textile printing, for the colouration of paper and paper laminates, for flushing into paint vehicles or lithographic varnish or for use in the mass pigmentation of fibre forming materials such as viscose. When the pastes are incorporated in emulsion paints, or in viscose, yellow to orange shades are obtained which have excellent fastness properties.

The azo colouring matters of the invention may also be formed in situ on textile materials. For example textile materials may be impregnated with an alkaline solution of the amide coupling component and treated with a solution of the diazotised amine (or a stable salt thereof such as a zinc chloride complex) to form the insoluble colouring matter on the fibre. If desired, the diazonium salt may be converted to a stable derivative such as a diazoamino compound and applied to textile materials in admixture with the amide coupling component, the insoluble colouring matter being subsequently developed on the fibre, for example by an acidic aftertreatment or by neutral steaming.

The invention is illustrated but not limited by the following examples in which the parts are by weight.

EXAMPLE 1

A suspension of 2.18 parts of 6-amino-2-hydroxy-4-methylquinoline in 40 parts of water is stirred with 4.5 parts of 10 N hydrochloric acid at 0° C. and diazotised by adding a solution of 0.88 part of sodium nitrite in 6.3 parts of water. The resulting solution is filtered and added with stirring to a cold suspension of acetoacet-4-chloro-2:5-dimethoxy-anilide in 65 parts of water, previously prepared by adding 15 parts of 4 N aqueous acetic acid and 5 parts of sodium acetate crystals to a solution of 3.5 parts of acetoacet-4-chloro-2:5-dimethoxyanilide in 50 parts of water containing 7.5 parts of 2 N aqueous potassium hydroxide. The mixture is stirred for 1 hour and the temperature slowly raised to between 65° and 70° C. and maintained for a further 1 hour. The yellow pigment is filtered off while hot, washed well with cold water and dried at 50° C.

When incorporated into paints the pigment has very good fastness to heat, light and solvents.

If in place of acetoacet-4-chloro-2:5-dimethoxyanilide in this example there is used a chemically equivalent amount of acetoacet-2:4-dimethylanilide a yellow pigment of greener shade is obtained.

EXAMPLE 2

In place of 2.18 parts of 6-amino-2-hydroxy-4-methylquinoline in Example 1 there are used 2.53 parts of 6-amino-2-hydroxy-4:5:8-trimethylquinoline. The resulting yellow pigment when incorporated into paints has very good fastness to heat, light and solvents and to outdoor exposure. It may also be used for the colouration of polyvinyl chloride and is suitable for use in the mass colouration of viscose rayon, giving bright yellow shades of good fastness properties.

EXAMPLE 3

In place of the 2.18 parts of 6-amino-4-methyl-2-hydroxyquinoline used in Example 1 there is used 2.55 parts of 6-amino-4-methyl-7-methoxy-2-hydroxyquinoline. When incorporated into paints the resulting yellow pigment has very good fastness to heat, light and solvents.

EXAMPLE 4

In place of the 2.18 parts of 6-amino-2-hydroxy-4-methylquinoline and 3.5 parts of acetoacetic-4-chloro-2:5-dimethoxyanilide used in Example 1 there are used 2.35 parts of 6-amino-4:8-dimethyl-2-hydroxyquinoline and 3.0 parts of acetoacetic-2:5-dimethoxyanilide. When incorporated into paints the resulting yellow pigment has very good fastness to heat, light and solvents.

EXAMPLE 5

In place of the 2.18 parts of 6-amino-2-hydroxy-4-methylquinoline and 3.5 parts of acetoacet-4-chloro-2:5-dimethoxyanilide used in Example 1 there are used 2.61 parts of 6-amino-7-chloro-2-hydroxy-4-methylquinoline and 2.7 parts of acetoacet-o-chloranilide. When incorporated into paints the resulting bright yellow pigment has very good fastness to heat, light and solvents.

EXAMPLE 6

In place of the 2.18 parts of 6-amino-2-hydroxy-4-methylquinoline and 3.5 parts of acetoacet-4-chloro-2:5-dimethoxyanilide used in Example 1 there are used 2.35 parts of 6-amino-4:7-dimethyl-2-hydroxyquinoline and 2.6 parts of acetoacet-2:4-dimethylanilide. When incorporated into paints the resulting reddish yellow pigment has very good fastness to heat, light and solvents.

The shades of colouring matters obtained by coupling the diazonium salts from variously substituted 6-amino-2-hydroxy-4-methylquinolines with variously substituted acetoacetanilides are shown in the following table.

| Additional Substituents in 6-amino-2-hydroxy-4-methylquinoline | Substituents in Acetoacetanilide | Shade |
|---|---|---|
| 5:8-dimethyl | 2:4-dimethyl | Yellow-orange. |
| Do | none | Reddish-yellow. |
| Do | 2-chloro | Do. |
| Do | 2-methyl | Do. |
| Do | 2-methoxy | Yellow. |
| Do | 4-ethoxy | Do. |
| Do | 2:5-dimethoxy | Do. |
| Do | 4-chloro-2-methoxy | Reddish-yellow. |
| Do | 2:4:6-trichloro | Yellow. |
| Do | 4-chloro-3-methoxy | Do. |
| 5:8-dimethoxy | 2:4-dimethyl | Do. |
| Do | 4-chloro-2:5-dimethoxy | Yellow-orange. |
| Do | 4-ethoxy | Yellow. |
| 7-chloro- | none | Do. |
| Do | 2-methyl- | Do. |
| Do | 2-methoxy | Do. |
| Do | 4-ethoxy- | Yellow-orange. |
| Do | 2:4-dimethyl | Yellow. |
| Do | 4-chloro-2:5-dimethoxy | Bright orange. |
| Do | 2:4:6-trichloro | Yellow. |
| Do | 5-benzylsulphonyl-2-methoxy. | Do. |
| 7-methyl- | 2-chloro- | Do. |
| Do | 4-ethoxy- | Yellow-orange. |
| Do | 4-chloro-2:5-dimethoxy | Do. |
| Do | 5-benzylsulphonyl-2-chloro- | Yellow. |
| 8-chloro- | 2-chloro- | Do. |
| Do | 4-ethoxy- | Do. |
| Do | 2:4-dimethyl- | Do. |
| Do | 4-chloro-2:5-dimethoxy | Do. |
| 8-methyl- | none | Yellow-orange. |
| Do | 2-chloro | Do. |
| Do | 4-ethoxy- | Yellow. |
| Do | 2:4-dimethyl | Yellow-orange. |
| Do | 4-chloro-2:5-dimethoxy | Do. |
| 7-methoxy- | 4-ethoxy | Yellow. |
| Do | 2:4-dimethyl | Do. |
| 5-chloro-8-methyl- | 2:5-dimethoxy | Do. |
| Do | 4-ethoxy | Bright orange. |
| Do | 5-chloro-2-methyl | Yellow. |
| Do | 4-chloro-2:5-dimethoxy | Orange. |
| Do | 2:4-dimethyl | Greenish yellow. |

6-amino-2-hydroxy-4-methylquinoline, 6-amino-2-hydroxy-4:7-dimethylquinoline and 6-amino-2-hydroxy-4:8-dimethylquinoline may be obtained as described by Balaban (Journal of the Chemical Society, 1930, page 2348) and 6-amino-8-chloro-2-hydroxy-4-methylquinoline may be obtained as in Example 10 of United States Patent No. 2,754,293. The other aminoquinoline compounds used in the above examples may be obtained as follows.

*6-Amino-2-Hydroxy-4:5:8-Trimethylquinoline*

A solution of 75 parts of acetoacet-2:4-dimethylanilide in 250 parts of 98% aqueous sulphuric acid is stirred at between 20° and 25° C. for 2 hours, poured into 1000 parts of water and neutralised by addition of sodium hydroxide solution. The precipitated 2-hydroxy-4:5:8-trimethylquinoline is filtered, washed with cold water and dried. 37.5 parts of the product are dissolved in 375 parts of sulphuric acid and nitrated at between 0° and 2° C. by addition of a mixture of 13.5 parts of nitric acid and 40.5 parts of sulphuric acid during 1 hour. After stirring for another hour the mixture is poured into 2000 parts of water and the precipitated nitro compound is filtered, washed acid free and purified by crystallisation from glacial acetic acid. It has a melting point of 282° to 284° C. 46 parts of the nitro compound are added during 1 hour to a boiling mixture of 60 parts of iron powder, 300 parts of aniline, 40 parts of water and 8 parts of glacial acetic acid and boiling is continued for a further 15 hours. The mixture is made alkaline by addition of sodium hydroxide solution, filtered while hot and the iron residues washed on the filter with 900 parts of hot aniline. The combined filtrates are then steam distilled to remove aniline and the amino compound is filtered off, washed and dried. It has a melting point of 310° to 312° C.

*6-Amino-7-Chloro-2-Hydroxy-4-Methylquinoline*

A solution of 212 parts of acetoacet-3-chloroanilide in 1060 parts of 98% aqueous sulphuric acid is heated to between 95° and 100° C. for 1 hour and cooled to between 0° and 5° C. A mixture of 66.3 parts of nitric acid and 200 parts of sulphuric acid is added with stirring at between 0° and 5° C. during 2 hours, the mixture is poured into 4000 parts of water and the precipitated solid is filtered, washed acid free and dried. The crude product (which is a mixture of isomers) is stirred for 1 hour with 1500 parts of glacial acetic acid at 100° C., filtered while hot and the insoluble solid washed with 500 parts of glacial acetic acid, then hot water and dried. The 7-chloro-2-hydroxy-4-methyl-6-nitroquinoline obtained has a melting point above 360° C. Reduction to the amine may be carried out by boiling 130 parts of the product with a mixture of 600 parts of aniline, 150 parts of iron powder, 80 parts of water and 20 parts of glacial acetic acid for 15 hours. The aniline is then steam distilled off leaving a residue of iron oxide and crude amine which is filtered and washed with water. The residue is stirred and boiled under reflux with 500 parts of ethyl alcohol, 500 parts of water and 75 parts of 32% aqueous sodium hydroxide. The insoluble iron oxide is filtered off and washed with a little hot ethyl alcohol, the combined filtrates are acidified with glacial acetic acid and the precipitated amine is filtered, washed well with water and dried. It has a melting-point of 299° to 301° C.

*6-Amino-7-Methoxy-2-Hydroxy-4-Methylquinoline*

93 parts of 3-methoxy-4-acetamidoaniline is dissolved in 100 parts of glacial acetic acid and added to a solution of 50 parts of diketene in 50 parts of glacial acetic acid during 15 minutes at between 50° and 55° C. After stirring for a further half hour the solution is poured into 600 parts of cold water, stirred for 2 hours and the solid is filtered, washed well with cold water and dried. The 3-methoxy-4-acetamido-acetoacetanilide so obtained has a melting point of 164° to 166° C. 80 parts of the product is dissolved in 240 parts of 98% aqueous sulphuric acid and the solution is stirred for 15 hours and poured into 720 parts of water. The mixture is heated for 2 hours in a boiling water bath and the solution is cooled to 20° C. when the sulphate of the required amine crystallises out. This is filtered off, washed and converted to the free base by suspending it in 1000 parts of boiling water and making alkaline with sodium carbonate solution. The amine so obtained has a melting point of 302° to 304° C. By recrystallisation from aniline the melting point may be raised to 309° to 310° C.

*6-Amino-2-Hydroxy-5:8-Dimethoxy-4-Methylquinoline*

64 parts of 2-hydroxy-5:8-dimethoxy-4-methylquinoline (obtainable as described by Kaslow and Sommer, Journal of the American Chemical Society, volume 68, page 645) is added during 30 minutes to a mixture of 39 parts of nitric acid and 204 parts of water, the temperature rising from 22° to 30° C. After stirring for 16 hours the suspended solid is filtered off, washed with cold water, dried, and crystallised from glacial acetic acid. The nitro compound so obtained has a melting point of 232° to 234° C. To reduce it to the amine 52 parts of the nitro compound are added during half an hour to a mixture prepared by boiling 60 parts of iron powder with 200 parts of ethyl alcohol, 40 parts of water and 5 parts of concentrated hydrochloric acid, and refluxed for 15 hours. Sodium hydroxide solution is then added to make the mixture alkaline and the iron residue is filtered off and washed with a little ethyl alcohol. The combined filtrates are neutralised with acetic acid and evaporated down to 200 parts by volume. The crude amine crystallises out on cooling and is purified by crystallisation from toluene. It has a melting point of 177° to 179° C.

*6-Amino-5-Chloro-2-Hydroxy-4:8-Dimethylquinoline*

5-chloro-2-hydroxy-4:8-dimethylquinoline is obtained by cyclisation of acetoacet-4-chloro-2-methylanilide and the product is nitrated and reduced. The reaction conditions correspond exactly to those described for the corresponding stages in the manufacture of 6-amino-2-hydroxy-4:5:8-trimethylquinoline.

After crystallisation from glacial acetic acid the product has a melting point of 360° C.

What we claim is:

1. Azo coloring matters which in one of their tautomeric forms are of the formula

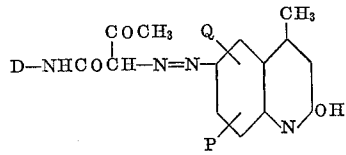

wherein
P and Q represent substituents selected from the group of substituents consisting of hydrogen and chlorine atoms and methyl and lower alkoxy groups,
and D represents a radical selected from the group of radicals consisting of o-tolyl, o-chlorophenyl, o-methoxyphenyl, p-ethoxyphenyl, 2-methyl-4-chlorophenyl, 2:4-dimethylphenyl, 4-chloro - 2 - methoxyphenyl, 2:5-dimethoxyphenyl, 4-chloro-3-methoxyphenyl, 4-chloro-2:5-dimethoxyphenyl and 5-chloro-2:4-dimethoxyphenyl.

2.

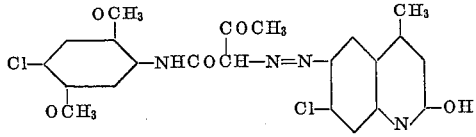

3.

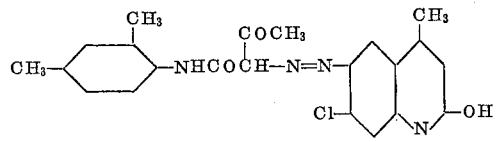

4. 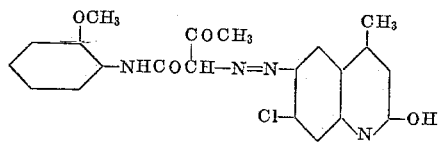
5.
6. 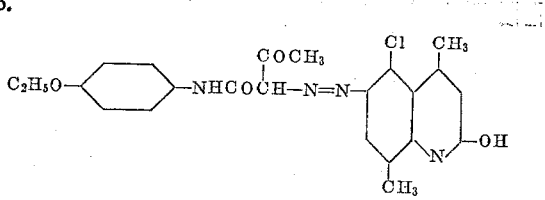
References Cited in the file of this patent
UNITED STATES PATENTS
2,173,056 Hitch et al. _____ Sept. 12, 1939
2,754,293 Brody et al. _____ July 10, 1956
2,781,345 Leavitt et al. _____ Feb. 12, 1957